United States Patent [19]

Sinnhuber

[11] Patent Number: 5,332,285
[45] Date of Patent: Jul. 26, 1994

[54] CHILD SEAT ARRANGED TO BE MOUNTED ON A VEHICLE SEAT

[75] Inventor: Ruprecht Sinnhuber, Gifhorn, Fed. Rep. of Germany

[73] Assignee: Volkswagen AG, Wolfsburg

[21] Appl. No.: 953,523

[22] Filed: Sep. 29, 1992

[30] Foreign Application Priority Data

Sep. 30, 1991 [DE] Fed. Rep. of Germany ....... 4132458

[51] Int. Cl.⁵ .............................................. A47D 1/10
[52] U.S. Cl. .................................. 297/250.1; 297/254
[58] Field of Search .................... 297/191, 250.1, 254, 297/238

[56] References Cited

U.S. PATENT DOCUMENTS

| | | | |
|---|---|---|---|
| 3,144,273 | 8/1964 | P'Simer et al. | 297/254 |
| 3,645,548 | 2/1972 | Briner | 297/254 X |
| 3,829,994 | 8/1974 | Hollins | 297/254 |
| 4,664,443 | 5/1987 | Casale | 297/238 |
| 4,681,366 | 7/1987 | Lobanoff | 297/191 |
| 4,792,183 | 12/1988 | Townsend, III | 297/191 X |

*Primary Examiner*—Michael F. Trettel
*Attorney, Agent, or Firm*—Brumbaugh, Graves, Donohue & Raymond

[57] ABSTRACT

In a child seat arrangement comprising a vehicle seat and a child seat removably mounted thereon, the child seat has a frame forming a hook connection with a main frame of the vehicle seat by a downwardly-pointing front portion thereof, which connection is releasable only after swinging the frame forward. At an upper rear portion, the frame of the child seat is restrained by a linkage to a headrest supported on the backrest of the vehicle seat.

4 Claims, 1 Drawing Sheet

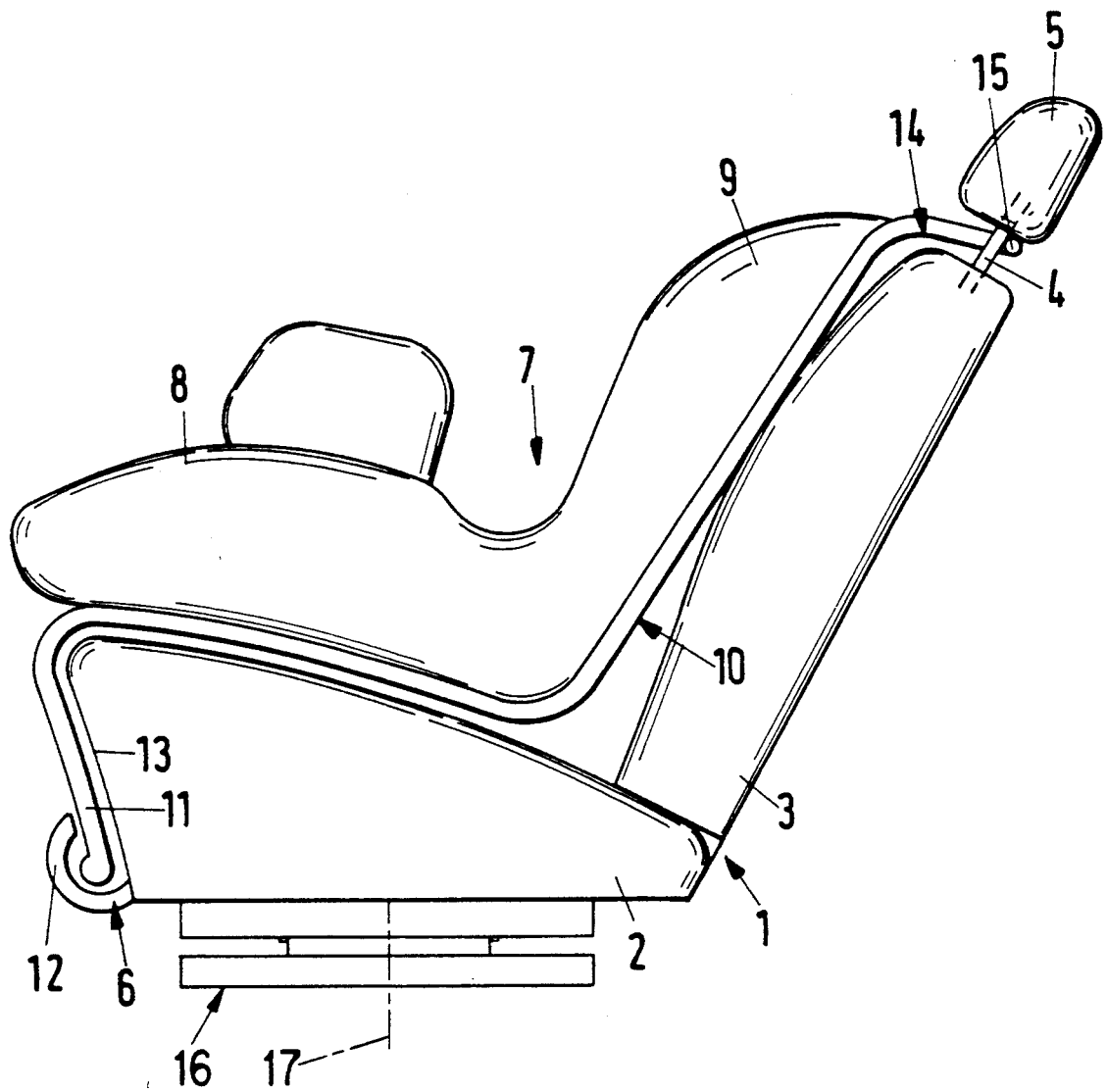

CHILD SEAT ARRANGED TO BE MOUNTED ON A VEHICLE SEAT

BACKGROUND OF THE INVENTION

This invention relates to child seats which are arranged to be mounted on a vehicle seat.

There are many patents relating to child seat arrangements which comprises a separate child seat to be placed on the seat of a vehicle.

In contrast to child seats consisting of parts which are integral with a vehicle seat and are pivotable into their operating position, child seat arrangements having a separate and independent child seat have the advantage of being readily replaced. In conventional arrangements of this kind, the mounting of a separate child seat to the vehicle seat is accomplished by belts, particularly the safety belts for use with the vehicle seat in which the child seat is mounted. One disadvantage of this arrangement is the difficulty involved in mounting the child seat, and another is the fact that if the child seat is carelessly fastened because of slack in the safety belt, the separate child seat will not be adequately restrained on the vehicle seat.

SUMMARY OF THE INVENTION

Accordingly, it is an object of the present invention to provide a child seat arranged to be mounted on a vehicle seat which overcomes the above-mentioned disadvantages of the prior art.

Another object of the invention is to provide a separate child seat arrangement which is capable of being positively secured to a vehicle seat by a few simple maneuvers.

These and other objects of the invention are attained by providing a child seat with a child seat frame which has a releasable linkage engageable with a vehicle seat headrest and a hook-like connection engageable with a vehicle seat frame and removable therefrom by a swinging motion when the headrest linkage is released.

One advantage of this arrangement is that it solves the problem of the prior art arrangements with minimal encroachment on the design of the main frame of the vehicle seat, so that a main frame structure required to achieve a hook connection with the child seat frame can be provided in mass production. Another advantage of the invention is that it utilizes an already existing linkage, i.e., the linkage supporting a headrest at the top of the backrest of the vehicle seat to restrain the child seat. Since such vehicle seat headrests are very generally not only vertically adjustable but also removable together with their support linkage, it is possible to remove the headrest in order to release the linkage to the child seat. Then, by simply pivoting the child seat forward about a transverse axis defined by the hook-like connection, it is possible to withdraw the frame of the child seat from the vehicle seat frame connection.

Use of the linkage supporting the headrest has the further advantage that an additional lateral restraint of the child seat, for example, by means of the vehicle seat safety belt or other belts, is not necessary.

The combination of the child seat arrangement with a vehicle seat as described in which the vehicle seat is pivotable 180° about a vertical axis, so that the child in the child seat faces to the rear and is restrained by the two backrests in the event of an accidental collision, is especially advantageous.

BRIEF DESCRIPTION OF THE DRAWING

Further objects and advantages of the invention will be apparent from a reading of the following description in conjunction with the accompanying drawing, which is a side view showing a representative child seat arrangement in accordance with the invention.

DESCRIPTION OF PREFERRED EMBODIMENT

In the typical embodiment of the invention shown in the drawing, a vehicle seat 1, which is generally conventional in structure and therefore need not be described in detail, consists essentially of a seat portion 2, a backrest 3 and a headrest 5 which in the illustrated embodiment is held by two rods 4 extending essentially perpendicularly from the backrest 3. Only one of these rods is visible in the drawing, the other being located behind the rod 4 seen in the drawing.

The vehicle seat 1 also has a main frame 6.

A child seat 7 similarly has a seat portion 8 and a backrest 9 as well as a frame 10 which is more or less M-shaped in the side view shown in the drawing and extends beneath the two components 8 and 9 of the child seat 7. Of special interest are the two end portions of this M-shaped frame 10. The front end portion 11 projects obliquely downward into a hook 12 formed on the main frame 6 of the vehicle seat and is prevented, for example by a protruding front portion 13 of the seat portion 2 of the vehicle seat 1, from moving upwardly out of the hook 12. The other end portion 14 of the M-shaped frame 10 extends between the two headrest support rods 4 and engages them from behind by a transverse branch 15 to restrain the frame 10 against both forward movement and lateral movement.

When the child seat 7 is to be removed, the headrest 5 together with the rods 4 is withdrawn from the backrest 3 so that the child seat frame 10 can be pivoted about a horizontal axis defined by the connection hooks 6 and 12 to swing it forward until the front end portion 11 is free to be lifted out of the hook 12.

It will be understood that the hook connections 6 and 12 may be varied both in number and in width. Likewise, the configuration of the frame portion 14 which secures it to the linkage 4 may be modified, for example, so that it encircles the linkage 4.

A pivotable seat support 16, schematically shown in the drawing, permits the vehicle seat 1 to be pivoted 180° about a vertical axis 17 so that the child in the child seat 7 faces to the rear of the vehicle and is restrained by the two backrests 3 and 9 in the event of an accidental collision.

The invention thus provides a child seat arrangement whereby a child seat can be dependably secured to a vehicle seat by simple maneuvers.

Although the invention has been described herein with reference to a specific embodiment, many modifications and variations therein will readily occur to those skilled in the art. Accordingly, all such variations and modifications are included within the intended scope of the invention.

I claim:

1. A child seat arranged to be mounted on a vehicle seat having a main frame with a front end, a backrest and a headrest mounted on the backrest by means of a linkage comprising a separate child seat having a frame and having a backrest, the frame having a front end and being mountable on and attachable to the vehicle seat so that a back of the child seat backrest rests against the backrest of the vehicle seat, at least one hook connection in the region of the front ends of the main frame and of the frame of the child seat capable of being released by a swinging motion of the child seat in a direction to move its backrest away from the backrest of the vehicle seat, and a releasable child seat restraint comprising a coupling connecting the headrest and an upper end portion of the backrest of the child seat.

2. An arrangement according to claim 1 wherein the frame of the child seat has an M-like shape in side view with a front portion projecting downwardly into at least one hook on the main frame and forming a child seat element of the hook connection, and including a rear upper portion projecting approximately horizontally into the linkage of the headrest to form the releasable restraint.

3. An arrangement according to claim 1 wherein the headrest is removable to release the restraint.

4. An arrangement according to claim 1 including a vehicle seat which is pivotable 180° about a vertical axis.

* * * * *